United States Patent
Huang et al.

(10) Patent No.: US 11,572,123 B2
(45) Date of Patent: Feb. 7, 2023

(54) EASILY AND QUICKLY FOLDABLE ELECTRIC SCOOTER

(71) Applicants: Kuo-Ming Huang, Taichung (TW); Chung-Tsung Huang, Taichung (TW)

(72) Inventors: Kuo-Ming Huang, Taichung (TW); Chung-Tsung Huang, Taichung (TW)

( * ) Notice: Subject to any disclaimer, the term of this patent is extended or adjusted under 35 U.S.C. 154(b) by 254 days.

(21) Appl. No.: 17/135,951

(22) Filed: Dec. 28, 2020

(65) Prior Publication Data

US 2022/0204115 A1 Jun. 30, 2022

(51) Int. Cl.
| | |
|---|---|
| *B62K 15/00* | (2006.01) |
| *B62K 11/14* | (2006.01) |
| *B62J 1/08* | (2006.01) |
| *B62J 43/28* | (2020.01) |
| *B62J 25/04* | (2020.01) |
| *B62K 11/10* | (2006.01) |
| *B62M 6/90* | (2010.01) |
| *B62J 43/16* | (2020.01) |
| *B62M 6/40* | (2010.01) |

(52) U.S. Cl.
CPC ............... *B62K 15/006* (2013.01); *B62J 1/08* (2013.01); *B62J 25/04* (2020.02); *B62J 43/16* (2020.02); *B62J 43/28* (2020.02); *B62K 11/10* (2013.01); *B62K 11/14* (2013.01); *B62M 6/40* (2013.01); *B62M 6/90* (2013.01); *B62K 2202/00* (2013.01)

(58) Field of Classification Search
CPC ...... B62K 15/006; B62K 11/10; B62K 11/14; B62K 2202/00; B62K 15/008; B62J 1/08; B62J 25/04; B62J 43/16; B62J 43/28; B62J 25/06; B62M 6/40; B62M 6/90
See application file for complete search history.

(56) References Cited

U.S. PATENT DOCUMENTS

| | | | |
|---|---|---|---|
| 6,371,235 B1 * | 4/2002 | Wisecarver .......... | B62K 15/008 280/43 |
| 9,533,729 B1 * | 1/2017 | Chan ......................... | B62J 1/08 |
| 2010/0206652 A1 * | 8/2010 | Kielland ............... | B62K 3/005 180/220 |
| 2012/0204771 A1 * | 8/2012 | Fukuhara ............... | B60N 3/002 108/134 |

FOREIGN PATENT DOCUMENTS

| | | | | |
|---|---|---|---|---|
| CN | 1079722 A | * | 12/1993 | ............... C03C 3/06 |
| CN | 101224775 A | * | 7/2008 | |
| WO | WO-2010072940 A1 | * | 7/2010 | ............. B62K 11/10 |

* cited by examiner

*Primary Examiner* — Darlene P Condra
(74) *Attorney, Agent, or Firm* — Bradley J. Thorson; DeWitt LLP

(57) ABSTRACT

An electric scooter includes: an upper plate member including two roll tubes and a shaft tube pivotally connected to a standing tube and inserted into the roll tubes, the standing tube having a hooking part and a connection part disposed between the roll tubes and inserted by the shaft tube; a lower plate member including a pressing part positioning with the hooking part; two frames pivotally connected between the upper and lower plate members through bolts, each opened frame including a clip tightly covering the standing tube; a stopper disposed between the upper and lower plate members and positioning the closed frames; and a pivotal connection seat including two frame fitting members covering the tapered portions and having a quick release member, a tapered seat base having a top part combined with a cover frame of the seat cushion provided with a quick release member fixed to a positioning hole.

3 Claims, 8 Drawing Sheets

EASILY AND QUICKLY FOLDABLE ELECTRIC SCOOTER

BACKGROUND OF THE INVENTION

(1) Field of the Invention

The invention relates to an easily and quickly foldable electric scooter, and more particularly to an easily and quickly foldable electric scooter for a user who cannot easily walk to quickly assemble the scooter and stably ride the scooter to travel.

(2) Description of the Prior Art

In general, a conventional disassemble and foldable scooter can help a user to walk, and has structures (e.g., handle, body and seat) having an outer tube tightly covering an inner tube, so that the assembling processes are slower and more complicated, and the applications thereof become narrower to encounter the dilemma.

SUMMARY OF THE INVENTION

In view of this, the present inventor has made deep conceiving, active research, improvements and tries to solve the above-mentioned problems, and thus developed and designed the present invention.

An objective of the invention is to provide an easily and quickly foldable electric scooter for a user who cannot easily walk to quickly assemble the scooter and stably ride the scooter to travel.

To achieve the above-identified objective, the invention provides an easily and quickly foldable electric scooter including: an upper plate member including two separately opposite roll tubes and a shaft tube, which can be pivotally connected to a standing tube and inserted into and fixed to the roll tubes, wherein the standing tube has a hooking part and a connection part which is disposed between the roll tubes and can be inserted by and fixed to the shaft tube; a lower plate member being disposed under the upper plate member and including a tightly pressing part capable of positioning with the hooking part; two frames respectively pivotally connected to and disposed between the upper plate member and the lower plate member through two bolts, wherein each of the frames includes a clip capable of tightly covering the standing tube when being opened, a rear fork assembled with a rear wheel, and a tapered portion being disposed around the rear fork and having a positioning hole; a stopper being fixed to and disposed between the upper plate member and the lower plate member and for positioning the frames being closed; and a pivotal connection seat including two frame fitting members capable of respectively covering the tapered portions and having a quick release member, a sleeve to be assembled with a bottom portion of a tapered seat base, a battery unit, and a seat cushion to be assembled with a top portion of the tapered seat base, wherein the tapered seat base has a top part, the seat cushion has a cover frame to be combined with the top part, the top part has a positioning hole, and the cover frame is provided with a quick release member to be fixed to the positioning hole of the top part.

A foot pedal is disposed around the clip of the frame, the standing tube can be pivotally connected to a tube member set having a handle, and the battery unit of the pivotal connection seat can be electrically connected to the handle.

The rear wheel has a motor, and the motor can be electrically connected to the battery unit.

The effect of the invention can provide a user, who cannot easily walk, a solution to quickly assemble the scooter and stably ride the scooter to travel.

DETAILED DESCRIPTION OF THE PREFERRED EMBODIMENTS

Figure 1:
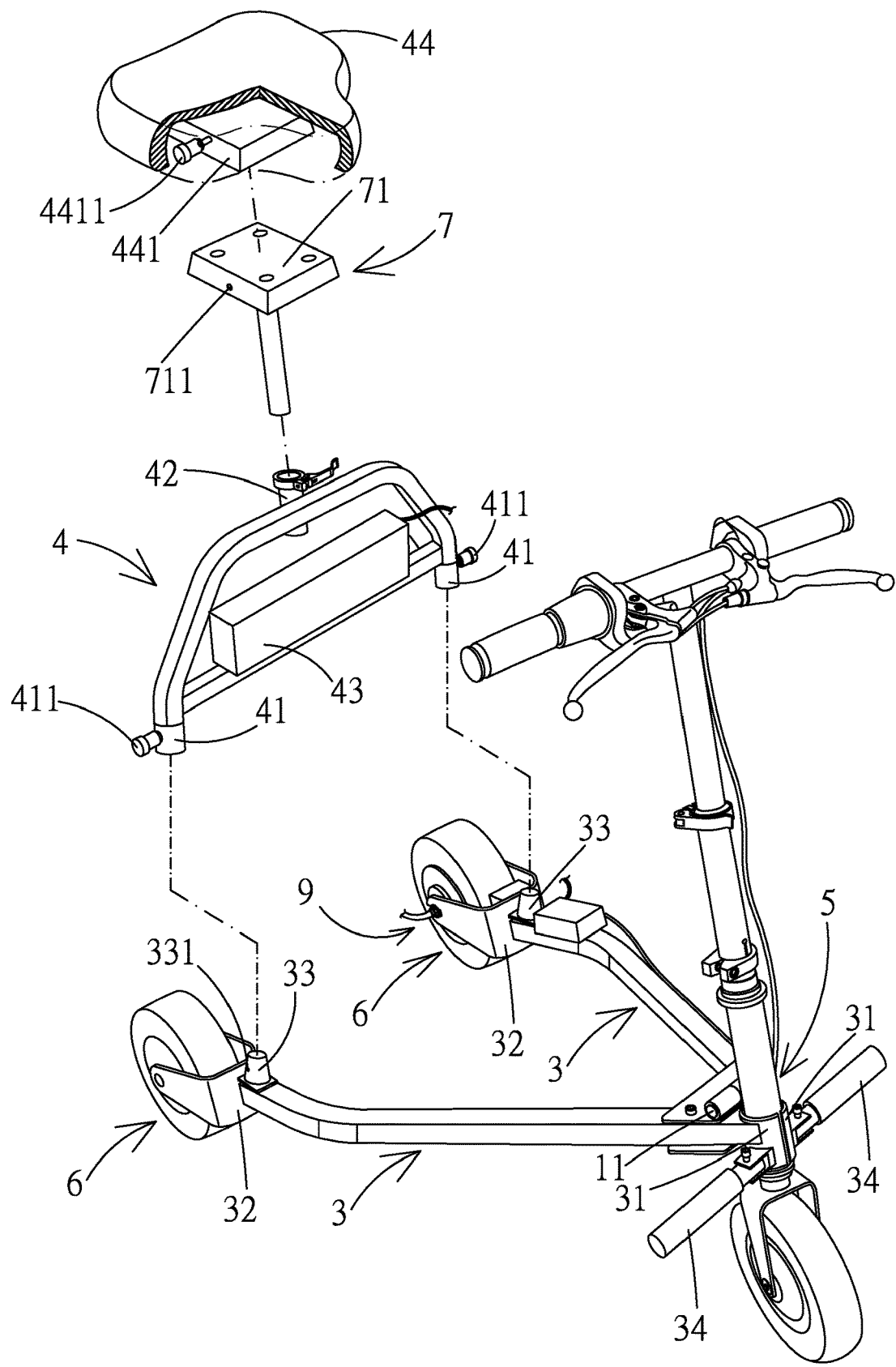
FIG. 1 is a pictorially exploded view showing an embodiment of the invention.
Figure 2:
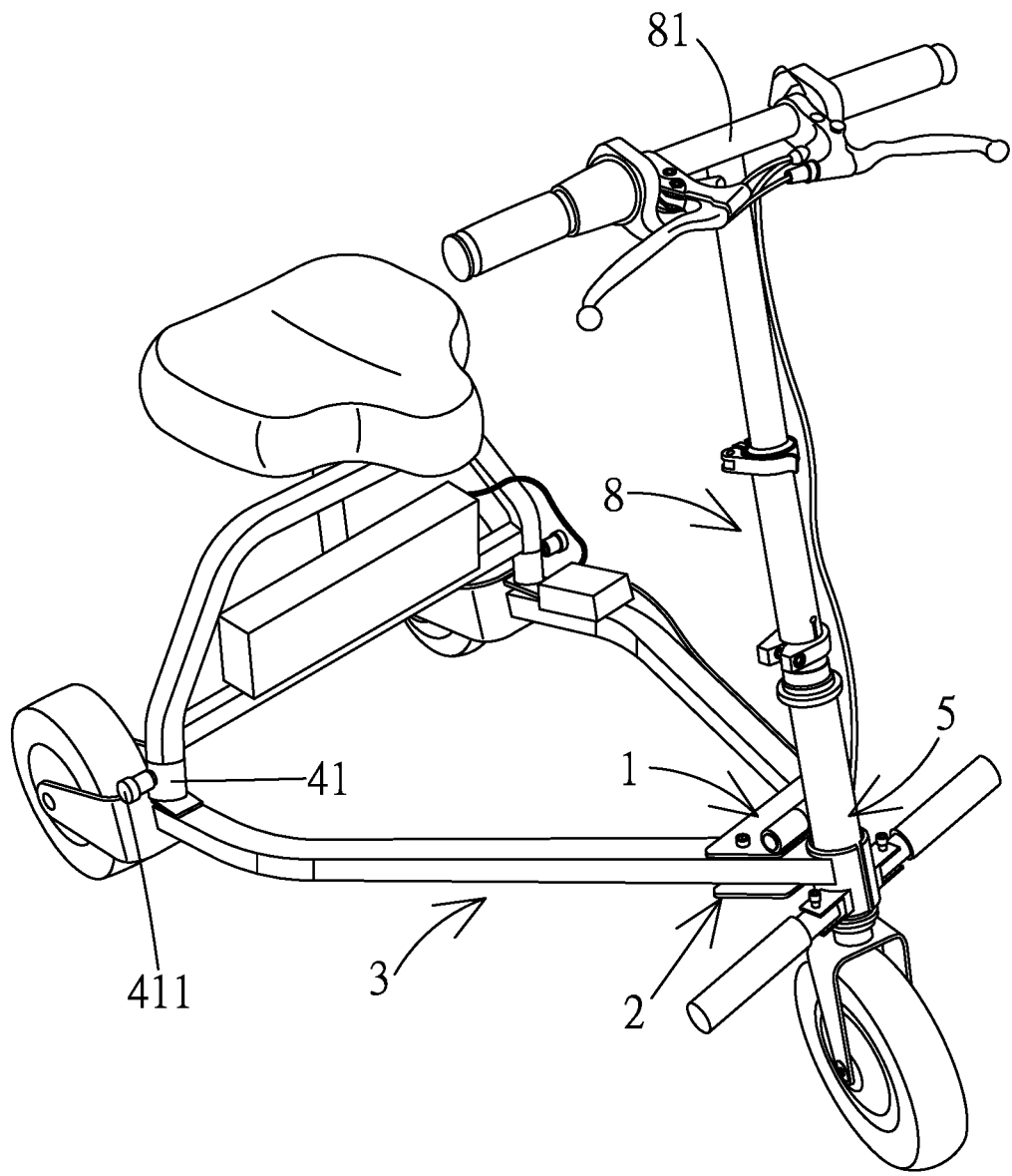
FIG. 2 shows a pictorially assembled view of FIG. 1.
Figure 3:
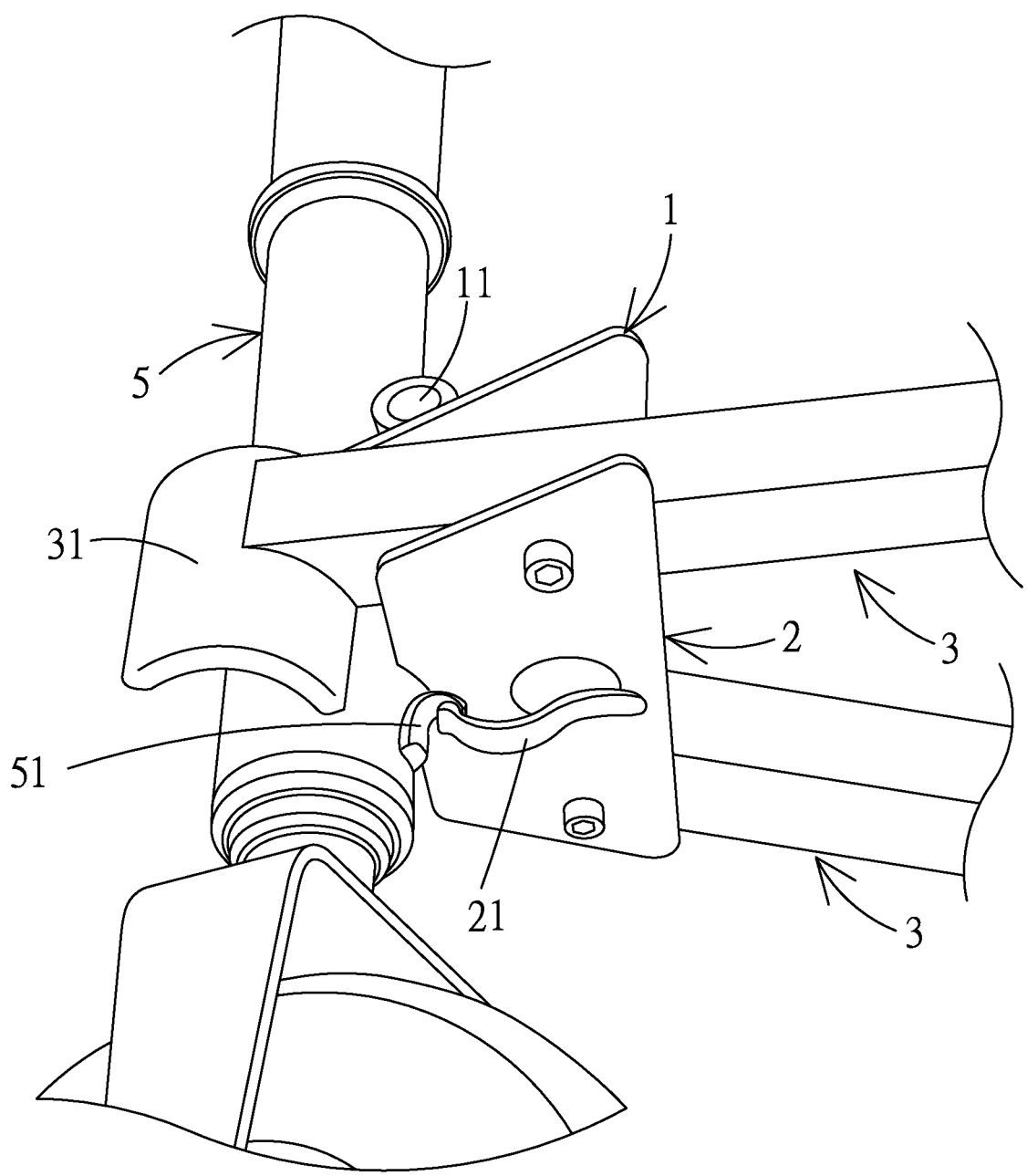
FIG. 3 is a pictorial view showing a clip capable of tightly covering a standing tube, and a tightly pressing part capable of positioning with a hooking part.
Figure 4:
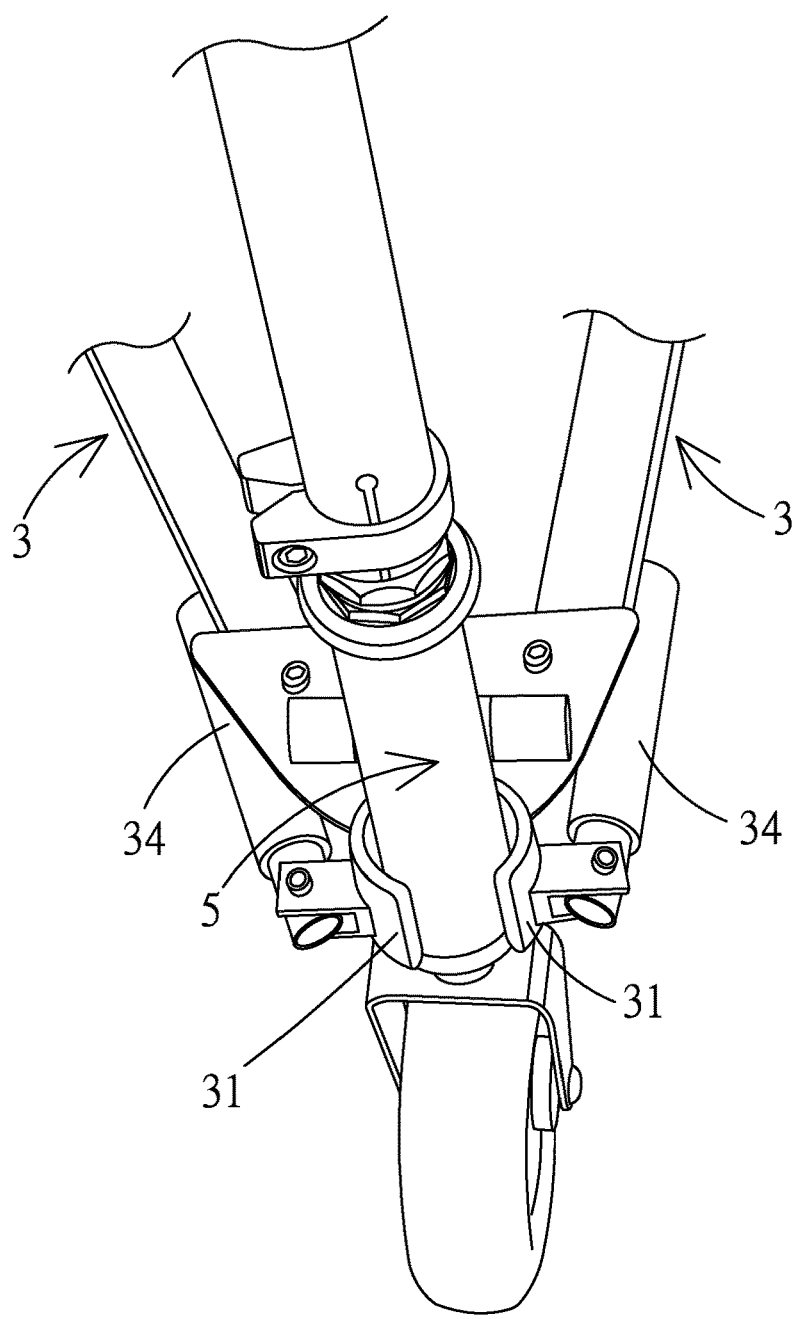
FIG. 4 is a pictorial view showing folded foot pedals around the clip.
Figure 5:
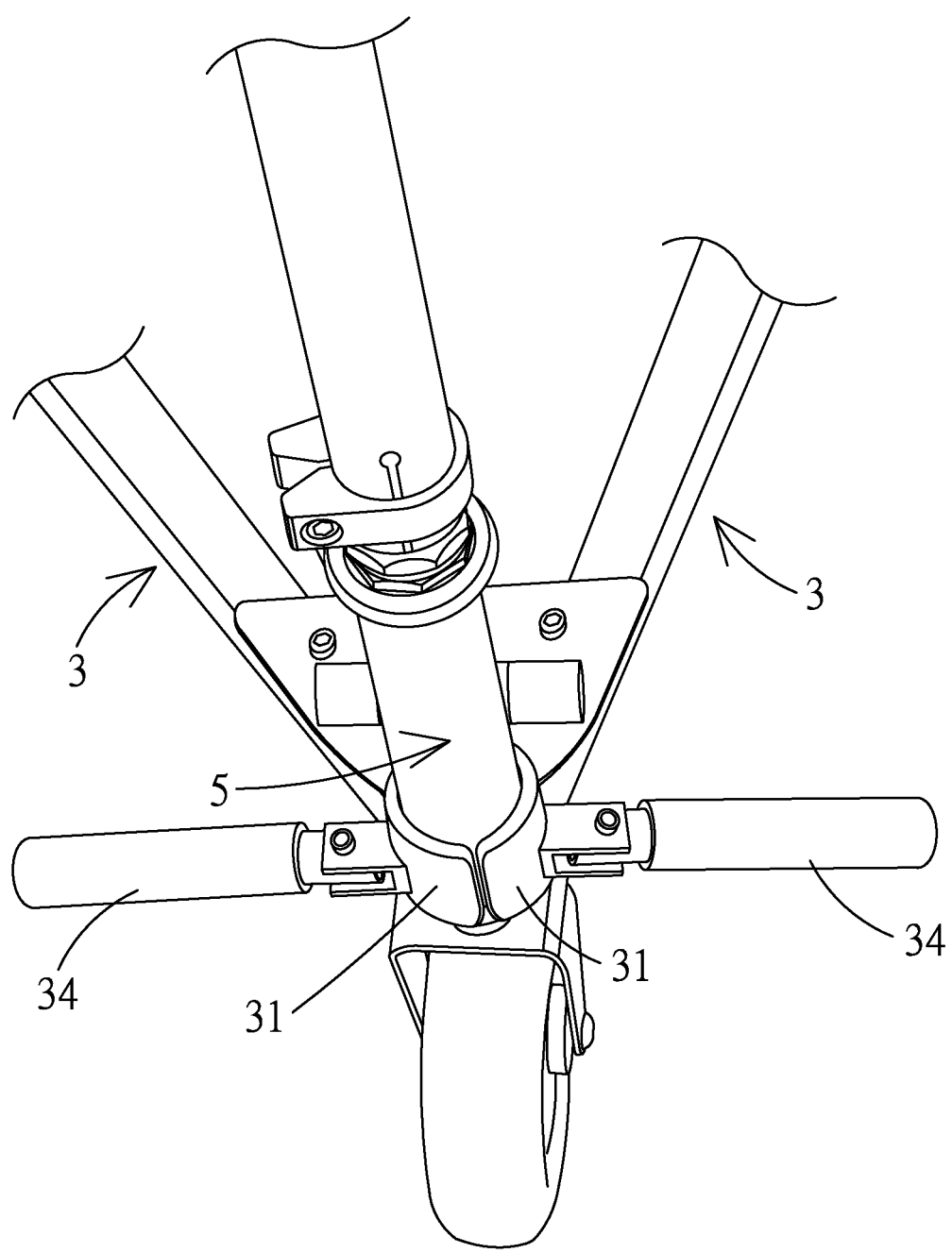
FIG. 5 is a pictorial view showing the developed foot pedals around the clip.
Figure 6:
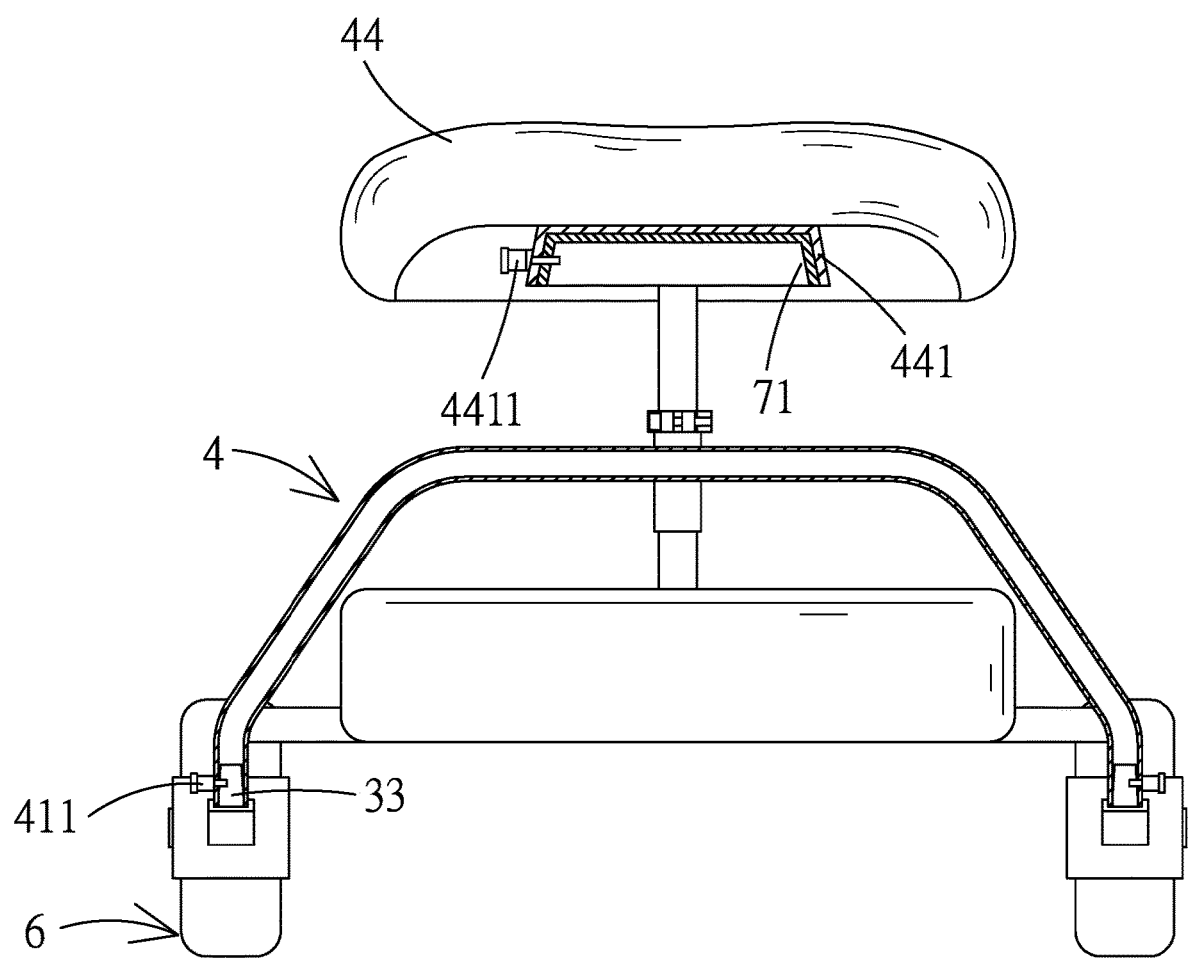
FIG. 6 is a schematically cross-sectional view showing FIG. 2 at another angle of view.
Figure 7:
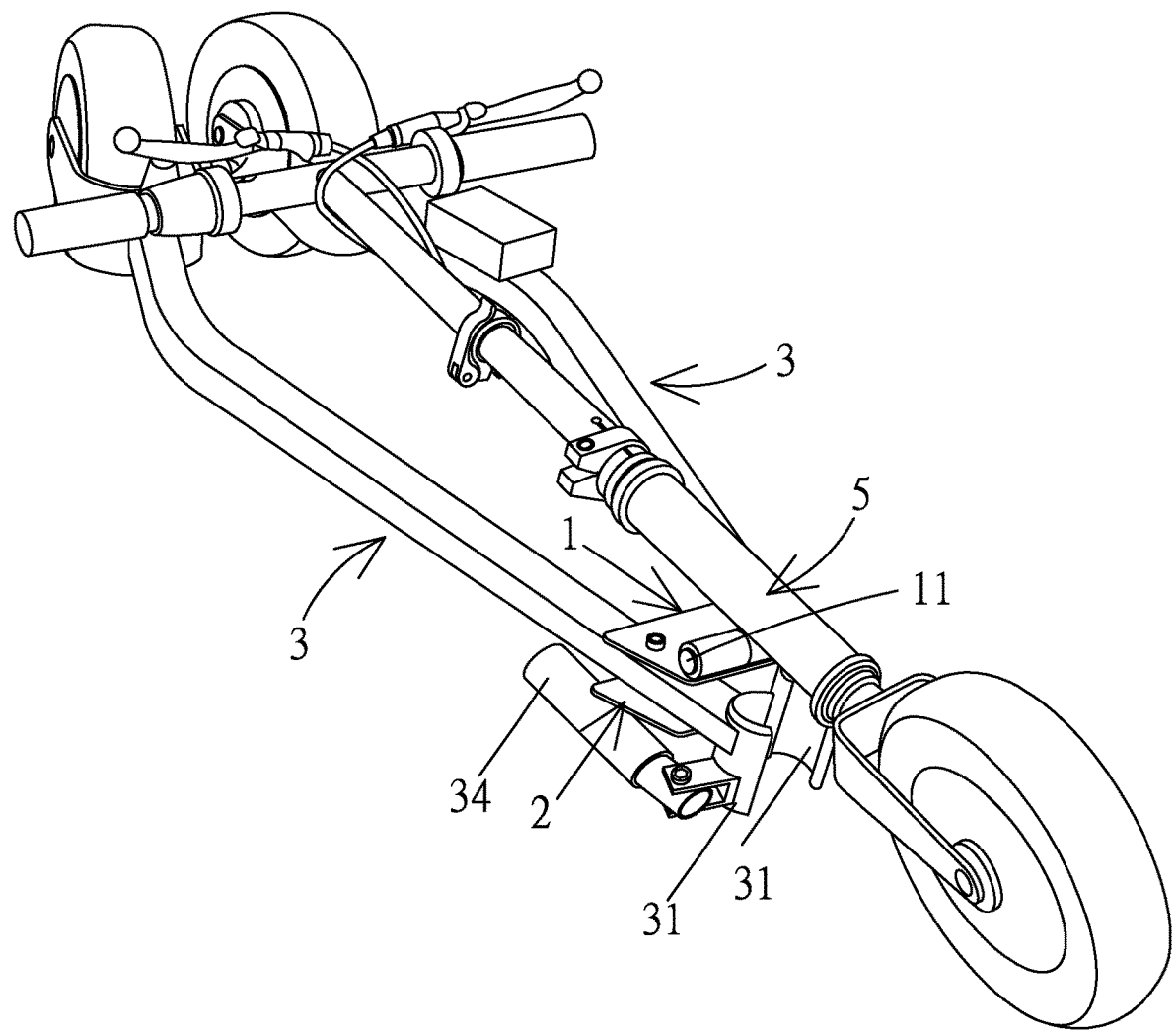
FIG. 7 is a pictorial view showing FIG. 2 in a folded state.
Figure 8:
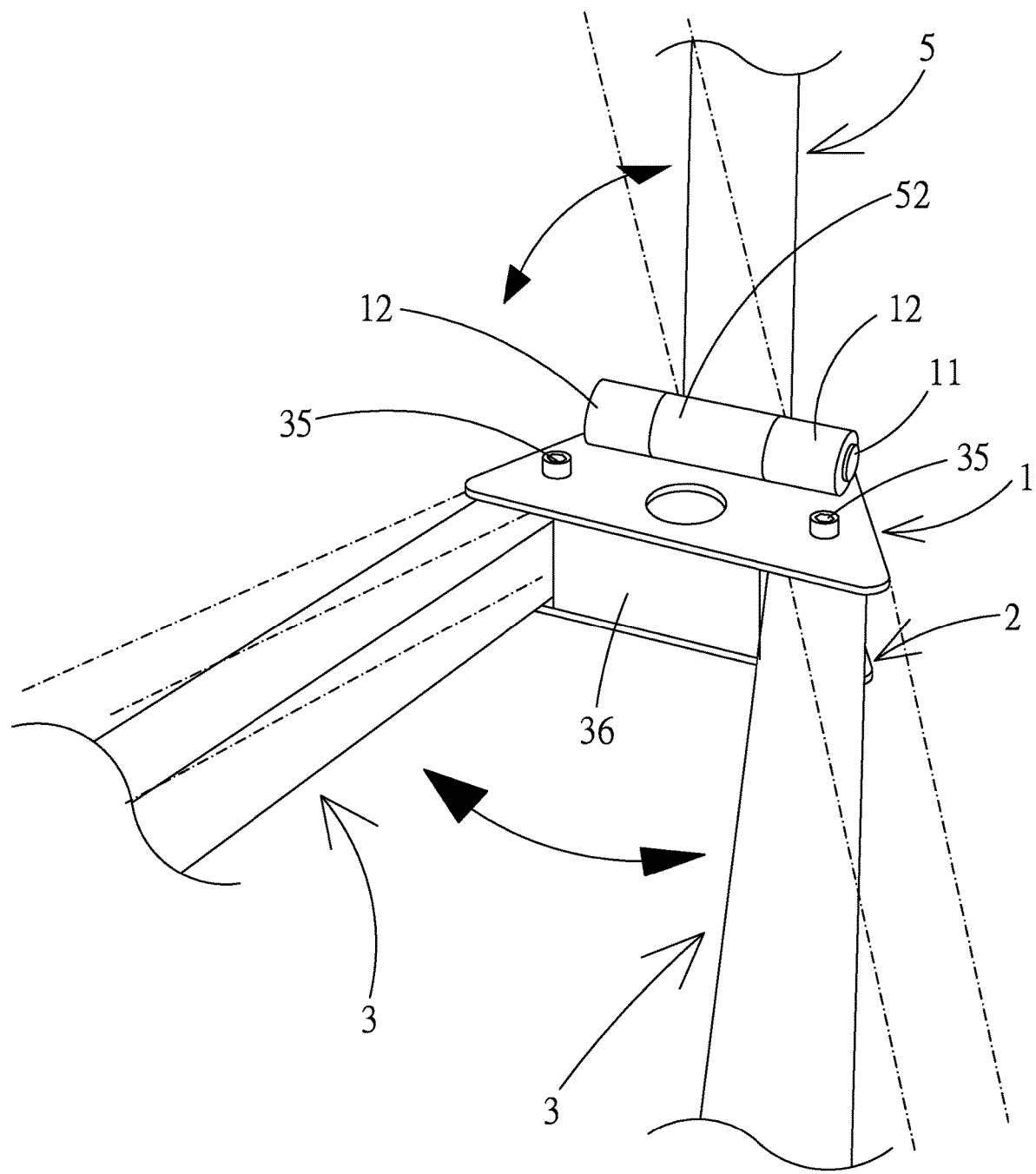
FIG. 8 is a pictorial view showing operational relationships between the standing tube, upper plate member, lower plate member and two frames of FIG. 1.

Referring to FIGS. 1 to 8, the invention provides an easily and quickly foldable electric scooter including: an upper plate member 1 including two separately opposite roll tubes 12 and a shaft tube 11, which can be pivotally connected to a standing tube 5 and inserted into and fixed to the roll tubes 12, wherein the standing tube 5 has a hooking part 51 and a connection part 52 which is disposed between the roll tubes 12 and can be inserted by and fixed to the shaft tube 11; a lower plate member 2 being disposed under the upper plate member 1 and including a tightly pressing part 21 capable of positioning with the hooking part 51; two frames 3 respectively pivotally connected to and disposed between the upper plate member 1 and the lower plate member 2 through two bolts 35, wherein each of the frames 3 includes a clip 31 capable of tightly covering the standing tube 5 when being opened, a rear fork 32 assembled with a rear wheel 6, and a tapered portion 33 being disposed around the rear fork 32 and having a positioning hole 331; a stopper 36 being fixed to and disposed between the upper plate member 1 and the lower plate member 2 and for positioning the frames 3 being closed; and a pivotal connection seat 4 including two frame fitting members 41 capable of respectively covering the tapered portions 33 and having a quick release member 411, a sleeve 42 to be assembled with a bottom portion of a tapered seat base 7, a battery unit 43, and a seat cushion 44 to be assembled with a top portion of the tapered seat base 7, wherein the tapered seat base 7 has a top part 71, the seat cushion 44 has a cover frame 441 to be combined with the top part 71, the top part 71 has a positioning hole 711, and the cover frame 441 is provided with a quick release member 4411 to be fixed to the positioning hole 711. A foot pedal 34 is disposed around the clip 31 of the frame 3, the standing tube 5 can be pivotally connected to a tube member set 8 having a handle 81, and the battery unit 43 of the pivotal connection seat 4 can be electrically connected to the handle 81. The rear wheel 6 has a motor 9, and the motor 9 can be electrically connected to the battery unit 43.

With the combination of various members mentioned hereinabove, as shown in FIGS. 1 to 8, the invention provides an easily and quickly foldable electric scooter, wherein the foot pedal 34 is disposed around the clip 31 of the frame 3, the standing tube 5 can be pivotally connected to the tube member set 8 having the handle 81, and the battery unit 43 of the pivotal connection seat 4 can be electrically connected to the handle 81. The rear wheel 6 has the motor 9, and the motor 9 can be electrically connected to the battery unit 43. Therefore, the invention can provide a user, who cannot easily walk, a solution to quickly assemble the scooter and stably ride the scooter to travel.

In summary, because the invention has the above-mentioned advantages and practical values, and no similar products are published, the application requirements of the invention patent have been satisfied, and the application is filed according to the law.

What is claimed is:

1. An easily and quickly foldable electric scooter, comprising:
    an upper plate member comprising two separately opposite roll tubes and a shaft tube, which can be pivotally connected to a standing tube and inserted into and fixed to the roll tubes, wherein the standing tube has a hooking part and a connection part which is disposed between the roll tubes and can be inserted by and fixed to the shaft tube;
    a lower plate member being disposed under the upper plate member and comprising a tightly pressing part capable of positioning with the hooking part;
    two frames respectively pivotally connected to and disposed between the upper plate member and the lower plate member through two bolts, wherein each of the frames comprises a clip capable of tightly covering the standing tube when being opened, a rear fork assembled with a rear wheel, and a tapered portion being disposed around the rear fork and having a positioning hole;
    a stopper being fixed to and disposed between the upper plate member and the lower plate member and for positioning the frames being closed; and
    a pivotal connection seat comprising two frame fitting members capable of respectively covering the tapered portions and having a quick release member, a sleeve to be assembled with a bottom portion of a tapered seat base, a battery unit, and a seat cushion to be assembled with a top portion of the tapered seat base, wherein the tapered seat base has a top part, the seat cushion has a cover frame to be combined with the top part, the top part has a positioning hole, and the cover frame is provided with a quick release member to be fixed to the positioning hole of the top part.

2. The easily and quickly foldable electric scooter according to claim 1, wherein a foot pedal is disposed around the clip of the frame, the standing tube can be pivotally connected to a tube member set having a handle, and the battery unit of the pivotal connection seat can be electrically connected to the handle.

3. The easily and quickly foldable electric scooter according to claim 2, wherein the rear wheel has a motor, and the motor can be electrically connected to the battery unit.

* * * * *